United States Patent
Grover et al.

(10) Patent No.: US 11,960,585 B2
(45) Date of Patent: Apr. 16, 2024

(54) OBFUSCATING BIOMETRIC DATA TO PROVIDE ENHANCED AUTHENTICATION SECURITY

(71) Applicant: MICRO FOCUS LLC, Santa Clara, CA (US)

(72) Inventors: Douglas Max Grover, Provo, UT (US); Michael F Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 119 days.

(21) Appl. No.: 17/538,720

(22) Filed: Nov. 30, 2021

(65) Prior Publication Data
US 2023/0169157 A1 Jun. 1, 2023

(51) Int. Cl.
| | | |
|---|---|---|
| *G06F 21/00* | (2013.01) | |
| *G06F 21/32* | (2013.01) | |
| *G06F 21/62* | (2013.01) | |
| *G06V 40/16* | (2022.01) | |

(52) U.S. Cl.
CPC .......... *G06F 21/32* (2013.01); *G06F 21/6245* (2013.01); *G06V 40/168* (2022.01); *G06V 40/172* (2022.01); *G06V 40/174* (2022.01)

(58) Field of Classification Search
CPC .. G06F 21/32; G06F 21/6245; G06F 21/6254; G06V 40/168; G06V 40/172; G06V 40/174; G06V 40/53
See application file for complete search history.

(56) References Cited

U.S. PATENT DOCUMENTS

| | | | |
|---|---|---|---|
| 10,469,259 B1 * | 11/2019 | Fox ....................... | H04L 9/0894 |
| 2004/0019570 A1 * | 1/2004 | Bolle ................... | G06V 40/168 |
| | | | 705/64 |
| 2006/0078171 A1 * | 4/2006 | Govindaraju ........ | G06V 10/806 |
| | | | 382/115 |
| 2009/0164797 A1 * | 6/2009 | Kramer .................. | G06F 21/32 |
| | | | 713/186 |
| 2010/0291909 A1 * | 11/2010 | Nagaraja ............... | H04M 1/575 |
| | | | 455/415 |
| 2016/0048670 A1 * | 2/2016 | Kim .................... | G06V 40/1353 |
| | | | 382/125 |

(Continued)

OTHER PUBLICATIONS

Maithili Arjunwadkar et al; "Robust Security Model for Biometric Template Protection Using Chaos Phenomenon"; International Journal of Computer Applications • Jun. 2010; 4 pages.

(Continued)

*Primary Examiner* — Jeffrey C Pwu
*Assistant Examiner* — William A Corum, Jr.
(74) *Attorney, Agent, or Firm* — Sheridan Ross P.C.

(57) ABSTRACT

A nonce is sent to a user communication device. Obfuscated biometric data is received from the user communication device. The obfuscated biometric data is generated by an obfuscation process that uses the nonce and first biometric data. The first biometric data is generated from a biometric of a user at the user communication device. For example, the first biometric data may be biometric data from a fingerprint scan. The obfuscation process is reversed by using the first nonce to produce the first biometric data. The first biometric data is compared to known biometric data of the user. In response to the first biometric data being within a threshold of the known biometric data, the user is authenticated.

20 Claims, 5 Drawing Sheets

(56) References Cited

U.S. PATENT DOCUMENTS

| | | | | |
|---|---|---|---|---|
| 2016/0306954 | A1* | 10/2016 | Hawkins | G07C 9/37 |
| 2018/0069703 | A1* | 3/2018 | Chakraborty | H04L 9/3231 |
| 2019/0213311 | A1* | 7/2019 | Tussy | G06V 10/17 |
| 2020/0252217 | A1* | 8/2020 | Mathieu | H04L 9/3231 |
| 2020/0259638 | A1* | 8/2020 | Carmignani | H04L 9/50 |
| 2020/0302152 | A1* | 9/2020 | Tagra | G06V 40/1371 |
| 2022/0188393 | A1* | 6/2022 | Forte | H04L 9/50 |
| 2023/0179596 | A1* | 6/2023 | Schonberger | H04L 63/0861 726/4 |
| 2023/0246839 | A1* | 8/2023 | Mathieu | H04L 9/006 713/186 |

OTHER PUBLICATIONS

Vishal M. Patel et al; Cancelable Biometrics: A Review; IEEE Signal Processing Magazine, vol. X, No. X; May 2015; 25 pages.

* cited by examiner

OBFUSCATING BIOMETRIC DATA TO PROVIDE ENHANCED AUTHENTICATION SECURITY

FIELD

The disclosure relates generally to biometrics and particularly to security enhancements for biometrics.

BACKGROUND

One problem with biometrics is that they are static. If a biometric is copied or compromised, its effectiveness diminishes dramatically because it cannot be changed. For example, a person's fingerprint cannot be changed. This is different from other credentials, such as, a username/password where the password can be periodically changed or changed if it is compromised. In addition, a user can gain access from a non-approved communication device. What is needed is a better way to protect the biometrics, so they are less vulnerable to compromise, to provide enhanced security even if the biometric becomes compromised, and to prevent access from an unauthorized user communication device.

SUMMARY

These and other needs are addressed by the various embodiments and configurations of the present disclosure. The present disclosure can provide several advantages depending on the particular configuration. These and other advantages will be apparent from the disclosure contained herein.

A nonce is sent to a user communication device. Obfuscated biometric data is received from the user communication device. The obfuscated biometric data is generated by an obfuscation process that uses the nonce and first biometric data. The first biometric data is generated from a biometric of a user at the user communication device. For example, the first biometric data may be biometric data from a fingerprint scan. The obfuscation process is reversed by using the first nonce to produce the first biometric data. The first biometric data is compared to known biometric data of the user. In response to the first biometric data being within a threshold of the known biometric data, the user is authenticated.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112 Paragraph 6. Accordingly, a claim incorporating the term "means" shall cover all structures, materials, or acts set forth herein, and all the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
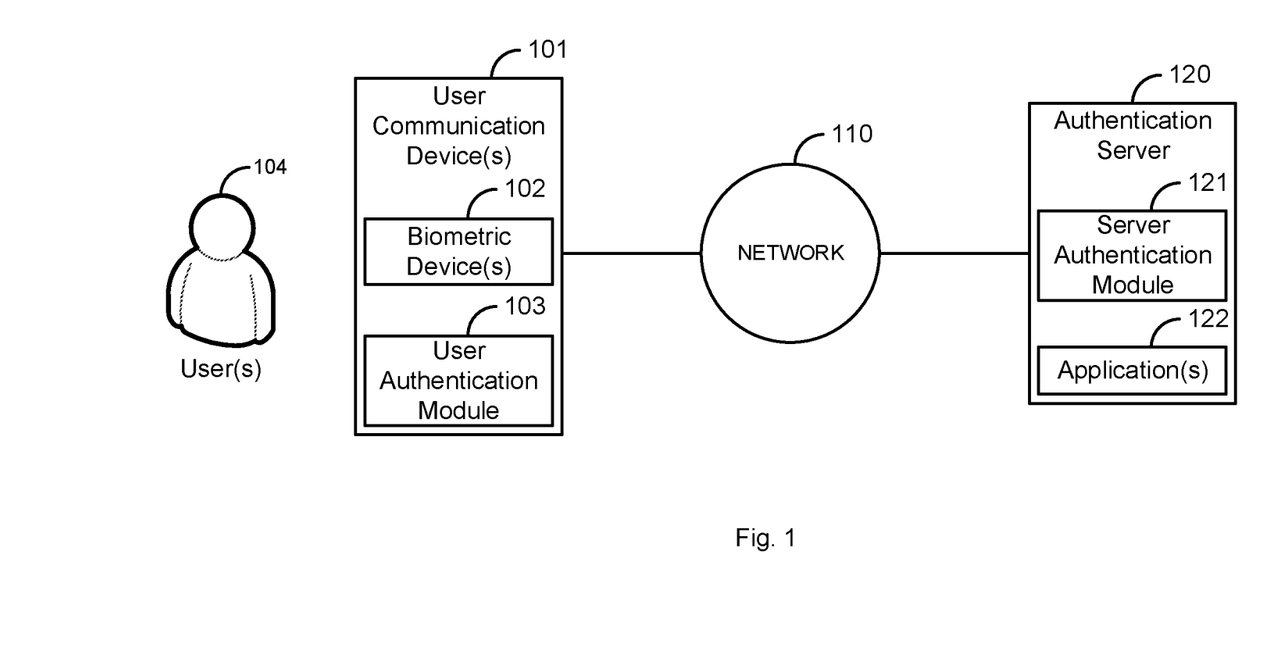
FIG. 1 is a block diagram of a first illustrative system for obfuscating biometric data to provide enhanced authentication security.

FIG. 1 is a block diagram of a first illustrative system 100 for obfuscating biometric data to provide enhanced authentication security. The first illustrative system 100 comprises user communication device(s) 101, a network 110, and an authentication server 120. In addition, a user 104 is shown for convenience. The user(s) 104 is a user of the user communication device(s) 101.

The user communication device(s) 101 can be or may include any device that can communicate on the network 110, such as a Personal Computer (PC), a telephone, a video system, a cellular telephone, a Personal Digital Assistant (PDA), a tablet device, a notebook device, a smartphone, a laptop computer, and/or the like. Although FIG. 1 only shows a single user communication device 101, there may be any number of user communication devices 101 connected to the network 110. The user communication devices 101 may have the same user 104 and/or different users 104. In FIG. 1, the user 104 may have one or more approved user communication devices 101 for authenticating into the authentication server 120 to access the application(s) 122.

The user communication device 101 further comprises one or more biometric devices(s) 102 and a user authentication module 103. The biometric device(s) 102, may comprise a variety of biometric devices 102 that detect a variety of biometrics, such as, a fingerprint scanner (minutia/pore), a retinal scanner, a facial scanner, a voiceprint scanner, a palm scanner, a vein scanner, a wrinkle scanner, a signature scanner, and/or the like.

The user authentication module 103 can be any hardware coupled with software that can provide authentication services to the authentication server 120. In addition to managing biometric authentication, the user authentication module 103 may handle other kinds of authentication, such as, a username/password, captchas, security questions, and/or the like. The user authentication module 103 works in conjunction with the server authentication module 121 to authenticate the user 104 to the authentication server 120/application(s) 122. The user authentication module 103 may be downloaded from the authentication server 120 and run in a browser on the user communication device 101.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The authentication server 120 can be or may include any hardware coupled with software that can provide access to the authentication server 120, the application(s) 122, the network 110, and/or the like. The authentication server 120 further comprise a server authentication module 121 and application(s) 122. The server authentication module 121 works in conjunction with the user authentication module 103 to authenticate the user 104. The server authentication module 121 may reside in a client device in a peer-to-peer authentication process. The authentication server 120 may provide authentication services for the network 110, a group of servers/application(s) 122, for the user communication device 101, and/or the like.

The application(s) 122 may be any application that requires an authentication process. The application(s) 122 may be a database application, a financial application, a networked application, a firewall, a security application, a human resources application, a document repository, a software code control application, a word processing application, a spreadsheet, an email application, and/or the like. Although the application(s) 122 are shown to reside on the authentication server 120, the application(s) 122 may reside external to the authentication server 120. For example, the application(s) 122 may reside on another server on the network 110 or on an external network 110 (e.g., a different corporate site).

Figure 2:
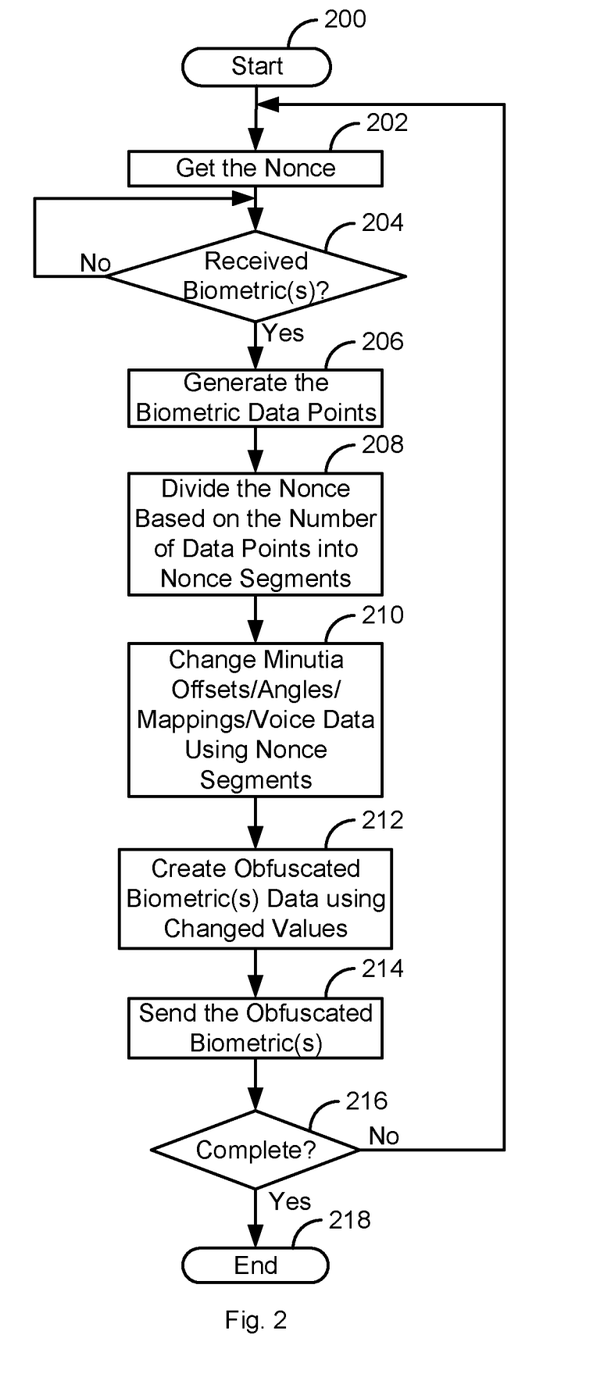
FIG. 2 is a flow diagram of a process for obfuscating biometric data to provide enhanced authentication security from a user communication device.

FIG. 2 is a flow diagram of a process for obfuscating biometric data to provide enhanced authentication security from a user communication device 101. Illustratively, the user communication device(s) 101, the biometric device(s) 102, the user authentication module 103, the authentication server 120, the server authentication module 121, and the application(s) 122 are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process of FIG. 2 uses an input (e.g., a nonce) where a permutation algorithm changes the biometric in a way that it identifies the specific device (an approved device) of the user 104. The biometric(s) are changed using the process described in FIG. 2 to uniquely identify each user communication device 101. The process of FIG. 2 is from the perspective of the user communication device 101.

The process starts in step 200. The user communication device 101 gets, in step 202, a nonce from the server authentication module 121. The nonce may be a generated by the server authentication module 121 using a random number generator or some other process. The user authentication module 103 waits, in step 204, to receive the biometric(s) from the user 104 via the biometric device(s) 102. For example, the biometric device 102 may capture a fingerprint of the user 104. In addition, other information may be received from the user 104 in step 204, such as, a username/password. If the biometric has not been received, the process of step 204 repeats.

Based on the received biometric(s) in step 204, biometric data points are generated for the individual biometric(s) in step 206. For example, the biometric data points may be data points from a fingerprint scan (X/Y coordinates/angles artifacts (i.e. minutia points or pore points)), an iris scan (X/Y coordinates/demodulation code/iris code), a faceprint (e.g., shape, size, wideness (e.g., wideness of the nose/eyes/ears/lips), relative location of features (e.g., depth/angle of jaw, etc.), a voiceprint (e.g., samples of the voiceprint using keywords based on phonemes/syllables), vein patterns, palm prints, hand lines, wrinkles, ear shape, signature recognition, and/or the like. The generation of the biometric data points can also be tied with infrared information to detect a live human biometric.

The nonce is divided up, based on the number of biometric data points into nonce segments in step 208. For example, the nonce may be divided up into equal nonce segments based on the scanned minutia points of a fingerprint. Each of the biometric data points are changed based the respective nonce segments in step 210. The change of the biometric data points may vary based on the biometric/permutation algorithm. How the nonce is divided up and how the biometric data points are changed is described in more detail in FIG. 3. Based on the changes, obfuscated biometric(s) data is created, in step 212, using the changed biometric data points. For example, a new obfuscated fingerprint data/iris data is created in step 212. The obfuscated biometric data is then sent to the server authentication module 121 in step 214.

The process determines, in step 216, if the process is complete. If the process is not complete in step 216, the process goes back to step 202. Otherwise, if the process is complete in step 216, the process ends in step 218.

Figure 3:
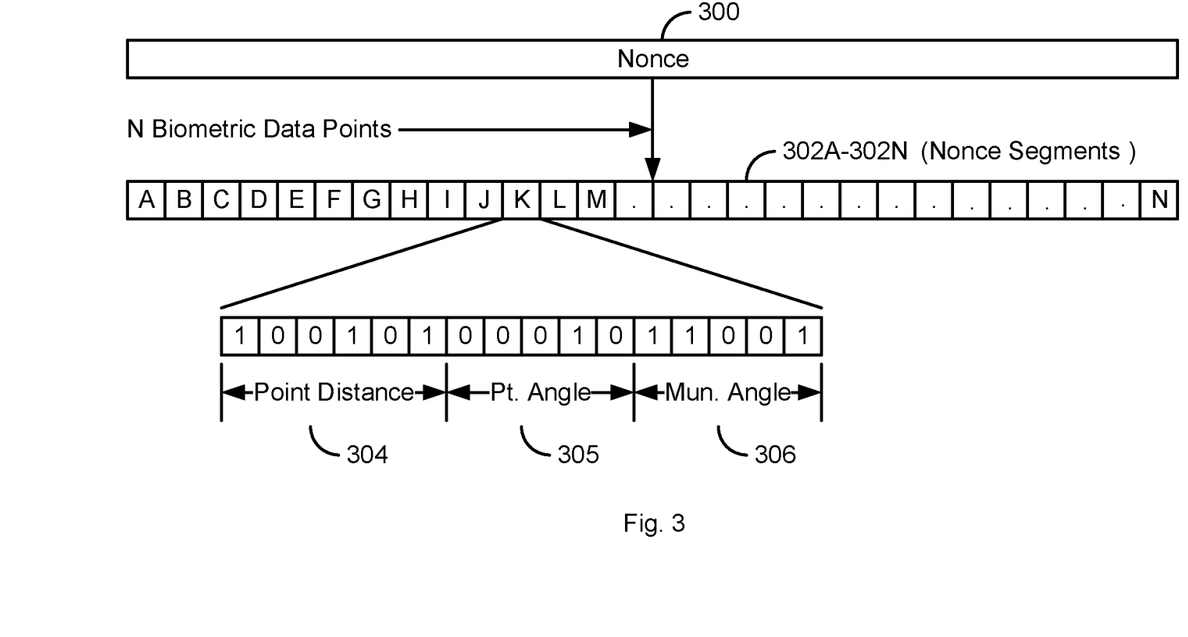
FIG. 3 is a diagram of a process of dividing up a nonce into nonce segments for obfuscating biometric data.

FIG. 3 is a diagram of a process of dividing up a nonce 300 into nonce segments 302A-302N for obfuscating biometric data. The process of FIG. 3 provides additional details of an exemplary embodiments of steps 208-210. After receiving the nonce 300, the user authentication module 103 divides the nonce 300 into nonce segments 302A-302N where N can be any positive integer. The nonce 300 may be divided into nonce segments 302 in various ways. For example, the nonce 300 may be divided into the nonce segments 302 based on the number of biometric data points for the scanned biometric. For example, if there are 32 minutia points in a fingerprint scan and the nonce 300 is 4096 bits, the size of each the nonce segments 302A-302N would be 128 bits. In the above example, the size of the nonce segments 302 would all be the same size. However, this may not always be the case. For example, if the number of minutia points is 28, the calculated size of the nonce segments 302 would 146.2857, which cannot be divided evenly. Here there would be two options: 1) to use a nonce segment size of 146 bits (a least common dominator where part of the nonce 300 is not used), or 2) to have some nonce segments 302 that have a size of 146 bits and have some nonce segments 302 that have a size of 147 bits (i.e., variable size nonce segments 302).

Another option would be to divide the nonce 300 based on a maximum number of biometric data points for the particular biometric. If the maximum number of biometric data points is 64 for a fingerprint scan and the nonce 300 is 4096 bits, the nonce segment size will always be 64 bits, regardless of the actual number of biometric data points identified by the fingerprint scan. For example, if there were 35 biometric data points identified in a fingerprint scan, there would be 35 nonce segments 302 of 64 bits. The rest of the nonce 300 may be unused or used for other obfuscation processes. The maximum number may be based on a maximum for a biometric that has the maximum number of biometric data points regardless of the biometric being used. For example, if an iris scan has a maximum number of 128 biometric data points (32-bit nonce segment size), the 32-bit nonce segment size may be used for all biometrics (e.g., for an iris scan, facial scan, fingerprint scan etc.). Alternatively, each biometric may divide the nonce 300 based on the maximum size for that particular biometric (each biometric uses the same nonce 300). In one embodiment, a new nonce 300 may be used for each biometric.

The nonce size may be dynamic and change each authentication. For example, the nonce segment size may be 64 bits one time and then 48 bits the next authentication cycle.

Another option would be to make the nonce 300 larger based on the number of supported biometrics in the user communication device 101. For example, if there was a single biometric supported, the size of the nonce 300 would be 4096 bits long. If there were two biometrics supported, the size of the nonce 300 may be doubled to 8192 bits long. If there was a third biometric supported, the size of the nonce 300 would be 12,288 bits long. One of skill in the art would recognize that the nonce 300 may be divided/used in other ways, such as, varying known segment sizes, changing segment sizes (e.g., using a different algorithm), and/or the like.

The data from the nonce segment 302 is then used to obfuscate the biometric data point. For example, as shown in FIG. 3, the nonce segments 302A-302N are for fingerprint minutia data points. In this example, the exemplary nonce segment 302K is divided into three sections: 1) a point distance value 304, 2) a point angle value 305, and 3) a minutia point angle 306. The point distance value 304 determines is how far the minutia is moved. The point angle value 305 determines the direction (0-360 degrees) used for moving the distance value (from the current angle). The minutia angle value 306 determines how much the minutia angle is changed (0-360 degrees). The order and/or size of the values 304-306 may vary based on implementation. If the data points are for pores (e.g., a fingerprint/palm scan), there may only be a point distance value 304 and a point angle value 305. In other words, the nonce segment 302 may only be divided up into two segments 304-305 instead of three segments 304-306.

The nonce segment 302 may be used in various ways, such as, based on a type of the biometric data, in a size of biometric data, a phoneme (e.g., a change to a different phoneme), a signal strength in a voiceprint sample, to a different wideness (e.g., in a facial print), in a different location, in a different relative distance, and/or the like. For example, if the nonce segment 302 is even, a value based on the nonce segment 302 may be subtracted from the biometric data point. If nonce segment 302 is positive, a value based on the nonce segment 302 may be added to the biometric data point. The biometric data point can be moved vertically based on another part of the nonce segment 302. A similar process can be accomplished for the minutia angle using part of the nonce segment 302. For example, the angle of the minutia point may move in a clockwise manner if the nonce segment 302 is even and the angle may move in a counterclockwise manner if the nonce segment 302 is odd. The distance of change for the angle may also be based on the nonce segment 302. For example, the higher the nonce segment number, the more distance the angle changes. Likewise, the lower the nonce segment number, the less the angle changes. The process of FIG. 3 can work in a similar manner for other types of biometrics, such as, facial recognition, voice prints, vein prints wrinkle prints, iris scans, and/or the like.

The processes described for obfuscating biometric data points may include adding and/or removing one or more biometric data points. For example, a minutia data point for a fingerprint can be added and/or removed based on a field in the nonce segment 302, based on an unused nonce segment 302, and/or the like. In the above examples where there are non-used nonce segments 302, the first available non-used nonce segment 302 (or any specific unused nonce segment 302) may be used to add a minutia data point (using the values in the non-used nonce segment 302). For example, if the non-used nonce segment 302 is positive, this may indicate to add a minutia data point. In this example, the non-used nonce segment 302 may not be based on a random number. In other words, the nonce 300 may have random and non-random components. The location/angle of the added minutia data point may be based on different fields (e.g., like values 304-306). The new minutia data point(s) is created and added to the obfuscated biometric data. By adding new minutia data point(s), this provides a watermark in the obfuscated biometric data that indicates it is from a valid user communication device 101.

If the minutia data point is to be removed, the last non-used nonce segment 302 may indicate the specific minutia data point to be removed (assuming that the minutia data points are numbered). The server authentication module 121 will then add back the removed minutia data point. The specific minutia data point being removed may change with each exchange of the nonce 300. In some embodiments, a minutia data point may not be removed and then the next time the nonce 300 is exchanged, a minutia data point may be removed and/or added. The permutation algorithm may dynamically change how the data points are added/removed.

For an iris scan, the X/Y coordinates may be changed in a similar manner using the nonce segment 302. The demodulation code/iris code may be obfuscated based on a portion of the nonce segment 302 like described in FIG. 3. The demodulation code/iris code is a code that represents a color pattern for the defined coordinate. Here, the demodulation code/iris code may be changed so that the color(s), an order of the colors, the X/Y coordinate and/or the like are now obfuscated.

For faceprints, the shape, size, wideness (e.g., a wideness of the head (e.g., top to bottom, side to side, etc.), between the eyes, between the ears, between the ends of the lips, etc.), a wideness of the nose, a depth/angle of the jaw may also be changed in a similar manner. For example, the wideness of the nose/eyes may be changed based on the nonce segment 302 (e.g., added to, subtracted from, lowered, moved up, etc.). Likewise, the jaw angle may change based on the nonce segment 302.

For voiceprints, the system would identify phonemes/syllables/signal strength from a voiceprint (e.g., the user 104 saying a standard phase). The values of the phonemes could then be changed in a similar manner as described above where the values of the phonemes/syllables are changed based on the nonce segments 302.

The nonce 300 could be divided up into multiple nonce segments 302 depending on the type of biometric. For example, there could be separate nonce segments 302 for the X coordinate, for the Y coordinate, and the angle for a fingerprint minutia point. Likewise, a separate nonce segment 302 can be generated for the X/Y/demodulation code/iris code of an iris scan. Based on the changes, an obfuscated biometric data is created based on the changed biometric data points. The obfuscated biometric data is sent to the authentication server 120 (e.g., an application server or trusted authority).

Figure 4:
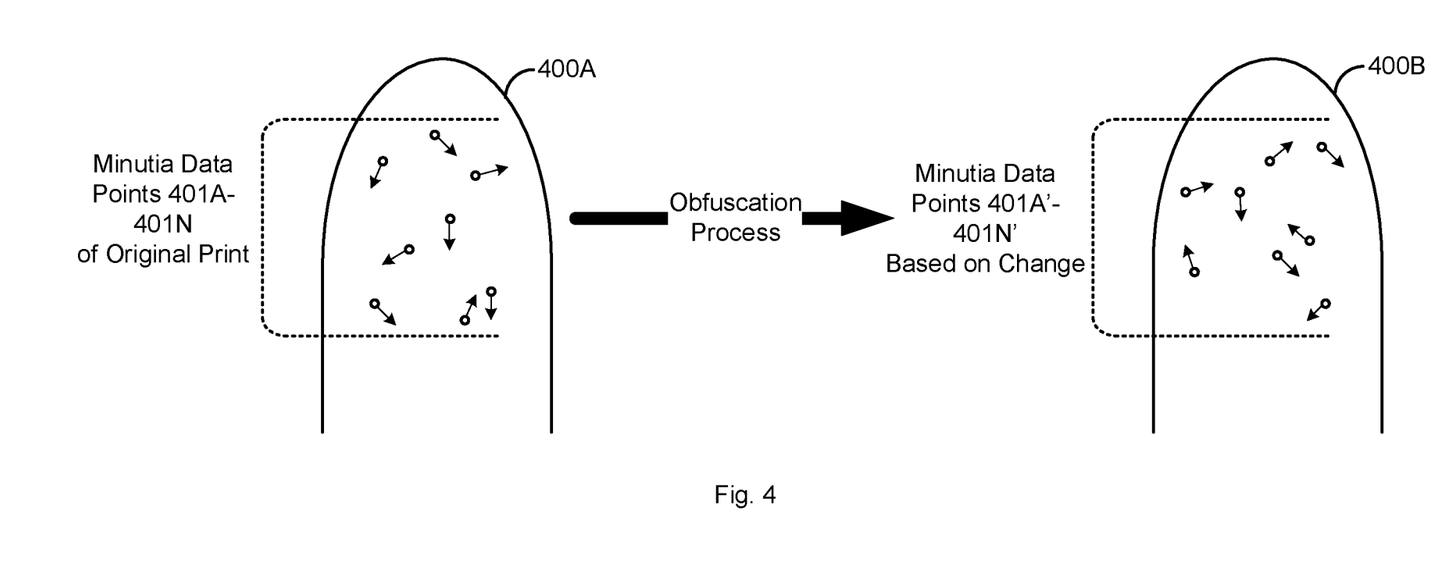
FIG. 4 is an exemplary diagram of how a fingerprint biometric is obfuscated.

FIG. 4 is an exemplary diagram of how a fingerprint biometric is obfuscated. FIG. 1 comprises a fingerprint 400A that comprises minutia data points 401A-401N. In FIG. 4 the minutia data points 401A-401N are at various locations on the fingerprint 400A. The minutia data points 401A-401N also have an associated angle. The angle is based on the angle that the minutia in the fingerprint points to when the minutia lines merge.

FIG. 4 illustrates how the process of FIGS. 2-3 take captured minutia points 401A-401N and based on the obfuscation processes described herein, convert the minutia data points 401A-401N to obfuscated minutia data points 401A'-401N' as shown in the obfuscated fingerprint 400B. The obfuscated minutia data points 401A'-401N' are then sent over the network 110 to the authentication server 120. The server authentication module 121 then reverses the obfuscation process to generate the minutia data points 401A-401N.

Figure 5:
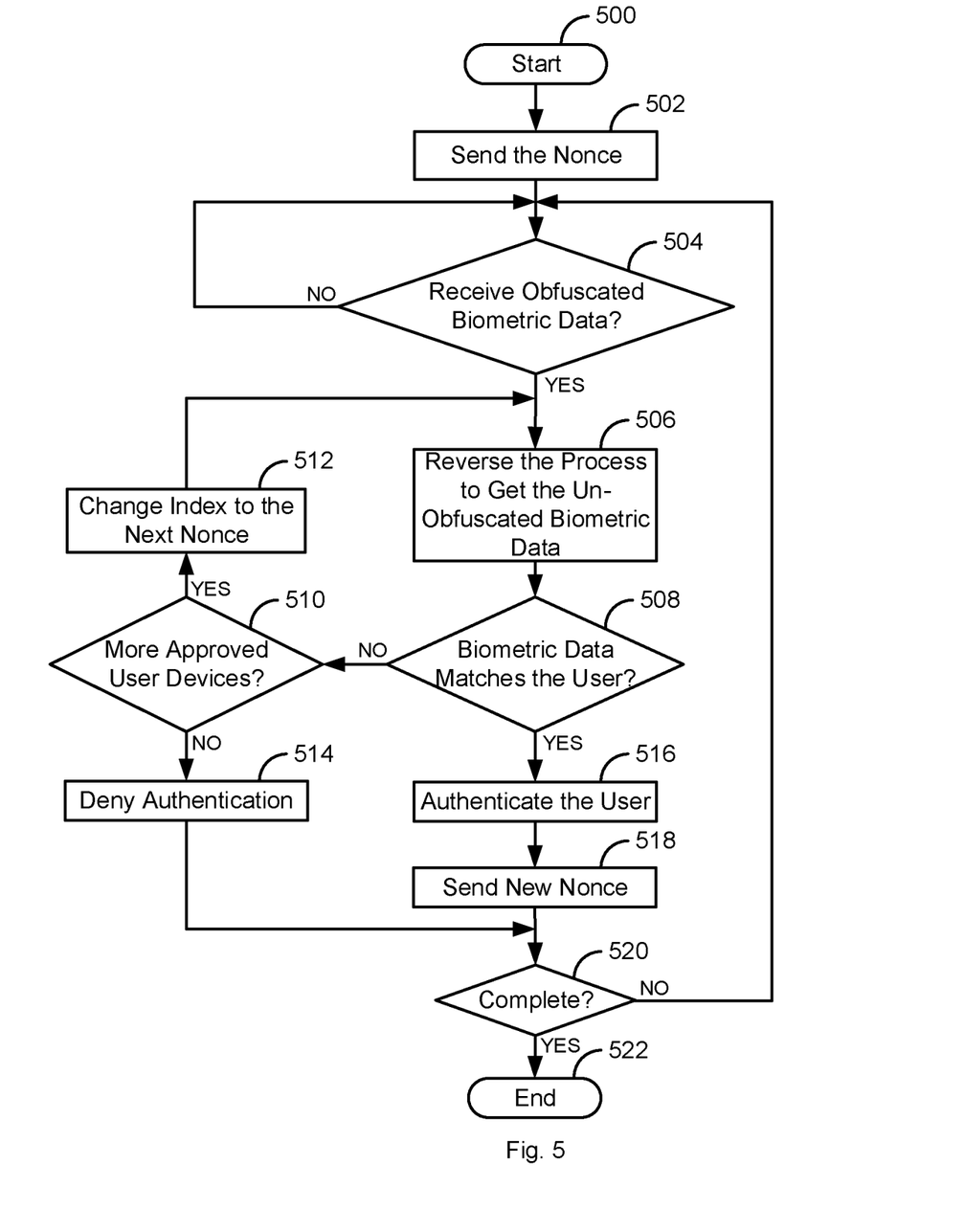
FIG. 5 is a flow diagram of a process for obfuscating biometric data to provide enhanced authentication security by an authentication server.

FIG. 5 is a flow diagram of a process for obfuscating biometric data to provide enhanced authentication security by an authentication server 120. The process of FIG. 5 is from the perspective of the authentication server 120.

The process starts in starts in step 500. The server authentication module 121 sends the nonce 300 to the user communication device 101 in step 502. The server authentication module 121 waits, in step 504, to receive obfuscated biometric data from the user communication device 101. The obfuscated biometric data may comprise multiple types of biometric data (e.g., a fingerprint scan biometric data and iris scan biometric data). If the obfuscated biometric data is not received in step 504, the process of step 504 repeats. Once the obfuscated biometric data is received in step 504, the server authentication module 121 reverses the obfuscation process using the nonce 300 to get the un-obfuscated biometric data in step 506. The server authentication module 121 determines, in step 508, if the un-obfuscated biometric data matches the user's stored biometric data. If there is a match (e.g., within a threshold), the user 104 is authenticated in step 516. A new nonce 300 is then sent by the server authentication module 121 to the user communication device 101 in step 518. The new nonce 300 may also be generated in step 518. The process then goes to step 520.

If there is not a match in step 508, the server authentication module 121 determines, in step 510, if the user 104 has more approved user communication devices 101. If there are more approved user communication devices 101, each approved user communication device 101 would have a separate nonce 300 that is stored in a nonce table/record. If there are more approved user communication devices 101, the index is changed to the next nonce 300 in the nonce table/record in step 512. The nonce table/record for each user communication device 101 may comprise a nonce 300 for each biometric data of the user 104. The process is repeated (goes back to step 506) for each nonce 300 until a match is found or there are no more nonces 300 in the nonce table/record. If no match is found, the user 104 is denied authentication in step 514.

The server authentication module 121 determines, in step 520, if the process is complete. If the process is not complete in step 520, the process goes back to step 504. Otherwise, if the process is complete in step 520, the process ends, in step 522.

While the process of FIG. 5 describes changing the nonce 300 with each authentication, a less secure process could use a single nonce 300 (e.g., a device ID) that does not change or where the nonce 300 is periodically changed (e.g., ever N authentications).

The process of FIG. 5 may also work where there are multiple users 104 that use the same user communication device 101. In this case, each user 104 would have their own nonce 300 for the user communication device 101. Based on the username, the system would find the appropriate nonce table. The process will also work for separate users 104 on different user communication devices 101.

In one embodiment, the permutation algorithm may be dynamic. For example, an index that identifies a specific permutation algorithm may be sent along with the nonce 300 to the user communication device 101. The user communication device 101 then uses the index to select the specific permutation algorithm to obfuscate the biometric data differently than the previous permutation algorithm. For example, the index may point to a different permutation algorithm that changes the size of the nonce segments 302 used for each minutia point. This could be done periodically or each time the nonce 300 is sent. By periodically changing the permutation algorithm, the security of the biometric data is further enhanced.

Even if a hacker has the biometric, the hacker will be unable to authenticate because the process requires more than valid biometric data. In addition, the hacker must know the specific permutation algorithm/nonce 300 to reverse the manipulated biometric. Changing the nonce 300 also prevents a replay attack because the nonce 300 and/or the permutation algorithm can be dynamically changed for each authentication. Thus, the security of the biometric is enhanced despite the biometric being exposed.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to standards and protocols, the disclosure is not limited to such standards and protocols. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that, when executed by the microprocessor, cause the microprocessor to:
    send a first nonce;
    receive obfuscated biometric data, wherein the obfuscated biometric data is generated by an obfuscation process that uses the first nonce and first biometric data, wherein the first biometric data is generated from a biometric of a user;
    reverse the obfuscation process by using the first nonce to produce the first biometric data;
    compare the first biometric data to known biometric data of the user;
    in response to the first biometric data being within a threshold of the known biometric data, authenticate the user; and
    segment the obfuscated biometric data into a plurality of biometric data points;
    wherein the obfuscation process divides the first nonce into a plurality of nonce segments and wherein each of the plurality of nonce segments is used to obfuscate each of a corresponding plurality of the biometric data points to generate the obfuscated biometric data.

2. The system of claim 1, wherein the first nonce is changed each time the user is authenticated.

3. The system of claim 1, wherein the first biometric data is fingerprint biometric data and wherein at least one of the plurality of nonce segments is further segmented into: a segment for a minutia point distance, a segment for a minutia point angle, and a segment for a minutia angle.

4. The system of claim 1, wherein the first biometric data is voiceprint biometric data and wherein at least one of the plurality of nonce segments is used to obfuscate the voiceprint biometric data by changing at least one of: a phoneme of the voiceprint biometric data, a syllable of the voiceprint biometric data, a frequency of the voiceprint biometric data, and an intensity in the voiceprint biometric data.

5. The system of claim 1, wherein the first biometric data is iris scan biometric data and wherein at least one of the plurality of nonce segments is used to obfuscate the iris scan biometric data by changing at least one of: coordinates of a demodulation code, a color, a color pattern, and an order.

6. The system of claim 1, wherein the first biometric data of the user is faceprint biometric data and wherein at least one of the plurality of nonce segments is used to obfuscate the faceprint biometric data by changing at least one of: a wideness of eyes, a wideness of ears, a wideness of a nose, a wideness of lips, a shape, a relative location, a jaw depth, and a jaw angle.

7. The system of claim 1, wherein the first nonce is divided into the plurality of nonce segments based on one of:
  a maximum number of biometric data points for a type of biometric;
  a number of biometric data points for the first biometric data;
  a least common denominator based on the number of biometric data points for the first biometric data;
  a variable size division process based on the number of biometric data points for the first biometric data;
  a changing nonce segment size;
  a permutation algorithm; and
  a plurality of biometrics.

8. The system of claim 1, wherein the obfuscated biometric data is generated based on at least one of:
  adding a biometric data point to the obfuscated biometric data; and
  removing a biometric data point from the first biometric data.

9. The system of claim 1, wherein the first nonce is sent to a first user communication device of the user, wherein the user is authenticated from the first user communication device, wherein a second nonce that is different from the first nonce is sent to a second user communication device of the user, and wherein the user is authenticated from the second user communication device using the same obfuscation process based on the second nonce and the first biometric data.

10. The system of claim 1, wherein the obfuscation process is dynamically changed based on at least one of: each time the user is authenticated and periodically.

11. A method comprising:
  sending, by a microprocessor, a first nonce;
  receiving, by the microprocessor, obfuscated biometric data, wherein the obfuscated biometric data is generated by an obfuscation process that uses the first nonce and first biometric data, and wherein the first biometric data is generated from a biometric of a user;
  reversing, by the microprocessor, the obfuscation process by using the first nonce to produce the first biometric data;
  comparing, by the microprocessor, the first biometric data to known biometric data of the user;
  in response to the first biometric data being within a threshold of the known biometric data, authenticating, by the microprocessor, the user; and
  segmenting, by the microprocessor, the obfuscated biometric data into a plurality of biometric data points;
  wherein the obfuscation process divides the first nonce into a plurality of nonce segments and wherein each of the plurality of nonce segments is used to obfuscate each of a corresponding plurality of the biometric data points to generate the obfuscated biometric data.

12. The method of claim 11, wherein the first nonce is changed each time the user is authenticated.

13. The method of claim 11, wherein the first biometric data is fingerprint biometric data and wherein at least one of the plurality of nonce segments is further segmented into: a segment for a minutia point distance, a segment for a minutia point angle, and a segment for a minutia angle.

14. The method of claim 11, wherein the first biometric data is iris scan biometric data and wherein at least one of the plurality of nonce segments is used to obfuscate the iris scan biometric data by changing at least one of: coordinates of a demodulation code, a color, a color pattern, and an order.

15. The method of claim 11, wherein the first nonce is divided into the plurality of nonce segments based on one of:
  a maximum number of biometric data points for a type of biometric;
  a number of biometric data points for the first biometric data;
  a least common denominator based on the number of biometric data points for the first biometric data;
  a variable size division process based on the number of biometric data points for the first biometric data;
  a permutation algorithm;
  a changing nonce segment size; and
  a plurality of biometrics.

16. The method of claim 11, wherein the obfuscated biometric data is generated based on at least one of:
  adding a biometric data point to the obfuscated biometric data; and
  removing a biometric data point from the first biometric data.

17. The method of claim 11, wherein the first nonce is sent to a first user communication device of the user, wherein the user is authenticated from the first user communication device, wherein a second nonce that is different from the first nonce is sent to a second user communication device of the user, and wherein the user is authenticated from the second user communication device using the same obfuscation process based on the second nonce and the first biometric data.

18. A non-transient computer readable medium having stored thereon instructions that cause a processor to execute a method, the method comprising:
  instructions to:
    send a nonce;
    receive obfuscated biometric data, wherein the obfuscated biometric data is generated by an obfuscation process that uses the nonce and first biometric data, and wherein the first biometric data is generated from a biometric of a user;
    reverse the obfuscation process by using the nonce to produce the first biometric data;
    compare the first biometric data to known biometric data of the user;
    in response to the first biometric data being within a threshold of the known biometric data, authenticate the user; and
    segment the obfuscated biometric data into a plurality of biometric data points;
    wherein the obfuscation process divides the nonce into a plurality of nonce segments and wherein each of the plurality of nonce segments is used to obfuscate each of a corresponding plurality of the biometric data points to generate the obfuscated biometric data.

19. The method of claim 18, wherein the nonce is changed each time the user is authenticated.

20. The method of claim 18, wherein the first biometric data is fingerprint biometric data and wherein at least one of the plurality of nonce segments is further segmented into: a segment for a minutia point distance, a segment for a minutia point angle, and a segment for a minutia angle.

\* \* \* \* \*